(12) United States Patent
Hart et al.

(10) Patent No.: US 8,993,169 B2
(45) Date of Patent: Mar. 31, 2015

(54) ELECTRODE COMPOSITIONS, ENERGY STORAGE DEVICES AND RELATED METHODS

(75) Inventors: Richard Louis Hart, Broadalbin, NY (US); Michael Alan Vallance, Loudonville, NY (US); David Charles Bogdan, Jr., Scotia, NY (US)

(73) Assignee: General Electric Company, Niskayuna, NY (US)

(*) Notice: Subject to any disclaimer, the term of this patent is extended or adjusted under 35 U.S.C. 154(b) by 307 days.

(21) Appl. No.: 13/361,317

(22) Filed: Jan. 30, 2012

(65) Prior Publication Data

US 2013/0196209 A1  Aug. 1, 2013

(51) Int. Cl.
  *H01M 4/02* (2006.01)
  *H01M 4/04* (2006.01)
  *H01M 4/38* (2006.01)
  *H01M 4/52* (2010.01)

(52) U.S. Cl.
  CPC ............... *H01M 4/387* (2013.01); *H01M 4/52* (2013.01)
  USPC ........ 429/231.5; 429/149; 429/219; 429/220; 429/221; 429/222; 429/223; 429/224; 429/225; 429/229

(58) Field of Classification Search
  CPC ..... H01M 4/364; H01M 4/52; H01M 10/399; H01M 4/38; H01M 4/387
  USPC ............ 429/149, 153, 218.2, 219–229, 231.5
  See application file for complete search history.

(56) References Cited

U.S. PATENT DOCUMENTS

| | | | |
|---|---|---|---|
| 4,011,373 A * | 3/1977 | Kaun et al. | 429/221 |
| 4,366,215 A * | 12/1982 | Coetzer et al. | 429/199 |
| 7,537,863 B2 | 5/2009 | Eylem et al. | |
| 7,960,057 B2 | 6/2011 | Li et al. | |
| 2005/0121309 A1 | 6/2005 | Chhowalla et al. | |
| 2005/0271928 A1 * | 12/2005 | Ovshinsky et al. | 429/40 |
| 2006/0088763 A1 | 4/2006 | Li et al. | |
| 2006/0222953 A1 | 10/2006 | Inoue et al. | |
| 2008/0206631 A1 * | 8/2008 | Christensen et al. | 429/149 |
| 2008/0286649 A1 * | 11/2008 | Li et al. | 429/188 |
| 2010/2006233 | 3/2010 | Golightly et al. | |
| 2010/0173203 A1 | 7/2010 | Zhang et al. | |
| 2010/0210450 A1 | 8/2010 | Yadav | |
| 2011/0017610 A1 | 1/2011 | Hahn et al. | |
| 2011/0104570 A1 * | 5/2011 | Galloway et al. | 429/221 |

(Continued)

FOREIGN PATENT DOCUMENTS

CN  1842933 A  10/2006
DE  102007041828 A1  3/2009

(Continued)

OTHER PUBLICATIONS

Search Report and Written Opinion from corresponding PCT Application No. PCT/US2013/020989 dated Mar. 6, 2013.

(Continued)

*Primary Examiner* — Jonathan Jelsma
(74) *Attorney, Agent, or Firm* — Francis T. Coppa

(57) ABSTRACT

A positive electrode composition is presented. The composition includes at least one electroactive metal; at least one alkali metal halide; and at least one additive including a plurality of nanoparticles, wherein the plurality of nanoparticles includes tungsten carbide. An energy storage device, and a related method for the preparation of an energy storage device, are also presented.

23 Claims, 3 Drawing Sheets

(56) References Cited

U.S. PATENT DOCUMENTS

2011/0114075 A1    5/2011  Mills
2011/0268969 A1*  11/2011  Taniguchi et al. ............ 428/402

FOREIGN PATENT DOCUMENTS

| | | |
|---|---|---|
| EP | 2306580 A1 | 4/2011 |
| WO | 2005089383 A2 | 9/2005 |
| WO | 2010126648 A1 | 11/2010 |

OTHER PUBLICATIONS

Son et al., "Nanoparticle iron-phosphate anode material for Li-ion battery", American Institute of Physics, Appl. Phys. Lett., 2004, vol. 85, No. 24, 3 pages.

Wang et al., "Developments in Nanostructured Cathode Materials for High-Performance Lithium-Ion Batteries", Advanced Materials, Adv. Mater. 2008, 20, pp. 2251-2269.

* cited by examiner

ELECTRODE COMPOSITIONS, ENERGY STORAGE DEVICES AND RELATED METHODS

BACKGROUND OF THE INVENTION

This invention relates generally to electrode compositions. In some specific embodiments, the invention relates to positive electrode compositions that can be incorporated into energy storage devices.

Metal halide batteries (for example, sodium-metal chloride batteries) including a molten metal negative electrode (usually referred to as the anode) and a beta-alumina solid electrolyte, are of considerable interest for energy storage applications. In addition to the anode, the batteries include a positive electrode (usually referred to as the cathode) that supplies/receives electrons during the charge/discharge of the battery. The solid electrolyte functions as the membrane or "separator" between the anode and the cathode.

When these metal halide batteries are employed in mobile applications, such as hybrid locomotives or plug-in electric vehicles (PHEV), the batteries may be subjected to a combination of charging and discharging rates. When discharging using high discharge current rates (for example, at 110 W), multiple discharge cycles may be conducted with no significant increase in resistance, increase in charging time, or loss of capacity. However, when discharging at low discharge currents, the metal halide (such, as sodium metal halide) batteries may degrade very rapidly, and the charging time may increase significantly.

Thus, there is a need for metal halide batteries having the desired performance attributes for applications involving slow discharge rates. Further, there is a need for improved positive electrode compositions to provide the desired performance attributes in the metal halide batteries.

BRIEF DESCRIPTION OF THE INVENTION

One embodiment of the invention is directed to a positive electrode composition. The composition comprises at least one electroactive metal; at least one alkali metal halide; and at least one additive including a plurality of nanoparticles, wherein the plurality of nanoparticles includes tungsten carbide. An article that includes such a positive electrode constitutes another embodiment of the invention.

Another embodiment is directed to an energy storage device. The device comprises:

(a) a first compartment including an alkali metal;
(b) a negative electrode current collector;
(c) a second compartment including a positive electrode composition, the positive cathode composition including at least one electroactive metal; at least one alkali metal halide; at least one additive comprising a plurality of nanoparticles, wherein the plurality of nanoparticles comprises tungsten carbide; and at least one electrolyte;
(d) a positive electrode current collector; and
(e) a solid separator capable of transporting alkali metal ions between the first and the second compartments.

Another embodiment of the invention is directed to method for the preparation of an energy storage device, including:

(i) providing a housing having an interior surface defining a volume;
(ii) disposing a separator inside the housing, wherein the separator has a first surface that defines at least a portion of a first compartment, and a second surface that defines a second compartment, wherein the first compartment is in ionic communication with the second compartment through the separator;
(iii) disposing a positive electrode composition in the second compartment, wherein the positive electrode composition includes at least one electroactive metal; at least one alkali metal halide; and at least one additive including a plurality of nanoparticles, wherein the plurality of nanoparticles includes tungsten carbide.

DRAWINGS

DETAILED DESCRIPTION

Figure 1:
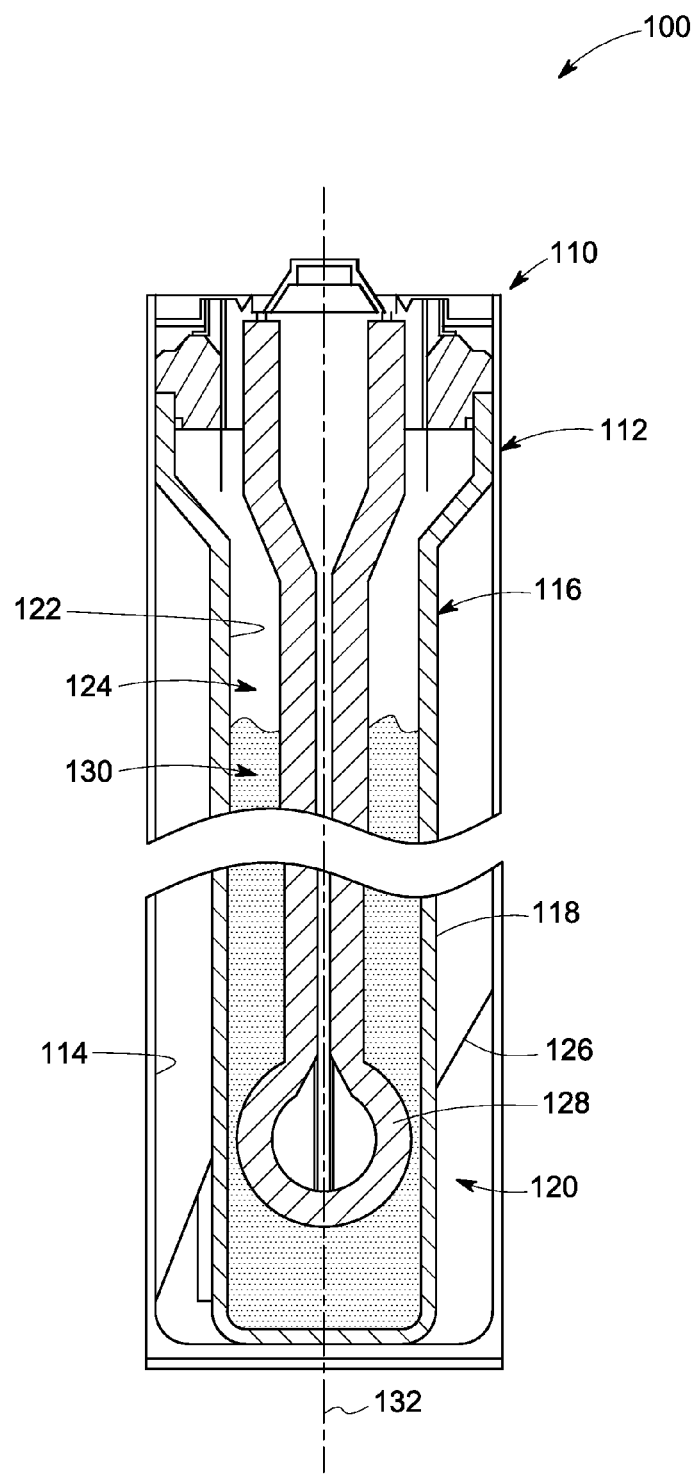
FIG. 1 is a schematic, cross-sectional view of a portion of an electrochemical cell, in accordance with some embodiments of the invention.

The invention relates generally to a positive electrode composition. More particularly, the invention relates to a positive electrode composition for an energy storage device. The invention also includes embodiments that relate to a method of making the energy storage device.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As noted earlier, in some applications, when discharging at low discharge currents, the metal halide batteries may degrade very rapidly and the charging time may increase significantly. The embodiments of the invention described herein address the noted shortcomings of the state of the art.

In some embodiments, a positive electrode composition is presented. The positive electrode composition includes at least one electroactive metal and at least one alkali metal halide. The positive electrode composition further includes at least one additive including a plurality of nanoparticles, wherein the plurality of nanoparticles includes tungsten carbide.

In some embodiments, the electroactive metal is selected from the group consisting of titanium, vanadium, niobium, molybdenum, nickel, cobalt, chromium, copper, manganese, silver, antimony, cadmium, tin, lead, iron, zinc, and combinations thereof. In some specific embodiments, the electroactive metal includes nickel, iron, copper, zinc, cobalt, chromium, or combinations thereof. In particular embodiments, the electroactive metal is nickel. In some embodiments, the electroactive metals may be obtained as powders from various commercial sources. In some embodiments, the positive electrode composition includes at least two electroactive metals. In some embodiments, the at least two electroactive metals include nickel and iron.

As noted, the positive electrode composition further includes at least one alkali metal halide. In some embodiments, a suitable alkali metal halide includes at least one halide of sodium, potassium, or lithium. In some embodiments, a suitable alkali metal halide includes a chloride, bromide, or fluoride. In some embodiments, the positive electrode composition includes at least one sodium halide. In some embodiments, the positive electrode composition includes sodium chloride. In some embodiments, the positive electrode composition includes at least two alkali metal halides. In some embodiments, the at least two alkali metal halides include sodium chloride and sodium iodide. In some further embodiments, the alkali metal halide includes sodium chloride and at least one of sodium iodide and sodium fluoride. In some embodiments, sodium iodide, when present, is at a level of about 0.1 weight percent to about 0.9 weight percent, based on the weight of the entire positive electrode composition. Some specific positive electrode compositions are described in copending application Ser. No. 13/034,184 (Bogdan Jr. et al); filed on 24 Feb. 2011, incorporated herein by reference.

Usually, the positive electrode composition further includes at least one additive. The term "additive" as used herein means that the additive material is present in the positive electrode composition in an amount in a range less than about 5 weight percent. In some embodiments, the additive is present in an amount in a range from about 0.1 weight percent to about 5 weight percent of the positive electrode composition. In some further embodiments, the additive is present in an amount in a range from about 0.25 weight percent to about 2.5 weight percent of the positive electrode composition.

The additive includes a plurality of nanoparticles. The term "nanoparticles" as used herein refers to particles having a largest dimension (for example, a diameter or length) in the range of from about 1 nanometer to 1000 nanometers. "Nanoparticle" as used herein may refer to a single nanoparticle, a plurality of nanoparticles, or a plurality of nanoparticles associated with each other. "Associated" refers to a nanoparticle in contact with at least one other nanoparticle. In one embodiment, associated refers to a nanoparticle in contact with more than one other particle.

The plurality of particles may be characterized by one or more of average particle size, particle size distribution, average particle surface area, particle shape, or particle cross-sectional geometry. In some embodiments, an average particle size of the plurality of nanoparticles may be in a range from about 1 nanometer to about 1000 nanometers. In some embodiments, an average particle size of the plurality of nanoparticles may be in a range from about 1 nanometer to about 500 nanometers. In some embodiments, an average particle size of the plurality of nanoparticles may be in a range from about 10 nanometers to about 200 nanometers. In some embodiments, the nanoparticle may include a plurality of particles having a particle size distribution selected from the group consisting of normal distribution, unimodal distribution, and bimodal distribution.

A nanoparticle may have a variety of shapes and cross-sectional geometries. In some embodiments, a nanoparticle may have a shape that is a sphere, a flake, a plate, a cube, or a whisker. A plurality of nanoparticles may include particles having two or more of the aforementioned shapes. In some embodiments, a cross-sectional geometry of the particles in the plurality of nanoparticles may be one or more of circular, ellipsoidal, triangular, rectangular, or polygonal. In some embodiments, the nanoparticles may be irregular in shape.

In some embodiments, the electroactive metal and the alkali metal halide may be present in the form of granules in the positive electrode composition. In some embodiments, the plurality of nanoparticles are incorporated into the positive electrode composition during the step of granule formation, as described herein later. Usually, the plurality of nanoparticles are uniformly dispersed within the granules of the positive electrode composition.

In some embodiments, the positive electrode composition further includes an electrolyte. In some embodiments, the positive electrolyte composition is infused with a molten electrolyte. In some embodiments, the molten electrolyte transports the ions from a separator (described later) to the positive electrode, and vice-versa. In one embodiment, the molten electrolyte includes a binary salt including an alkali metal halide and aluminum halide. In a specific embodiment, the molten electrolyte is sodium tetrachloroaluminate ($NaAlCl_4$). In some embodiments, the molten electrolyte may include an additional metal halide, and forms a ternary or quaternary electrolyte.

In addition to the components discussed above, the positive electrode composition may include a number of other constituents, in some embodiments. As an example, aluminum may be included in the positive electrode composition in a form other than its form in the electrolyte salt, and other than as an aluminum halide. In some embodiments, the aluminum may be in elemental form, e.g., aluminum metal flakes or particles. In some embodiments, the amount of elemental aluminum present in the positive electrode composition may be in a range from about 0.2 volume percent to about 0.5 volume percent, based on the volume of the positive electrode composition.

In some embodiments, it has been found advantageous to include sulfur in the positive electrode composition, usually in the form of molecular sulfur or a sulfur-containing compound, such as a metal sulfide. Suitable examples of metals in the metal sulfide include alkali metals or transition metals. In one embodiment, the positive electrode composition includes a metal polysulfide. In one embodiment, the metal polysulfide includes iron disulfide, sodium disulfide, nickel disulfide, or combinations thereof. If present, the level of sulfur is usually in the range from about 0.1 weight percent to about 5 weight percent, based on the total weight of the positive electrode composition. However, as described in application Ser. No. 13/034,184, it is sometimes preferred that the positive electrode be substantially free of sulfur, i.e., containing, at most, impurity levels.

In one embodiment, the positive electrode composition may further include sulfur, in the form of molecular sulfur or a sulfur-containing compound, such as a metal sulfide. Suitable examples of metals in the metal sulfide include alkali metals or transition metals. In one embodiment, the positive electrode composition includes a metal polysulfide. In one embodiment, the metal polysulfide includes iron disulfide, sodium disulfide, nickel disulfide, or combinations thereof. If present, the level of sulfur is usually in the range from about 0.1 weight percent to about 5 weight percent, based on the total weight of the positive electrode composition. However, as described in application Ser. No. 13/034,184, it is sometimes preferred that the positive electrode be substantially free of sulfur, i.e., containing, at most, impurity levels.

The positive electrode composition may also include other additives that beneficially affect the performance of an energy storage device. Such performance additives may increase ionic conductivity, increase or decrease solubility of the charged cathodic species, improve wetting of a solid electrolyte, i.e., the separator, by the molten electrolyte; or prevent ripening of the positive electrode micro-domains. In some embodiments, the performance additive may be present in an amount that is less than about 1 weight percent, based on the total weight of the positive electrode composition. Examples of such additives include one or two additional metal halides, e.g., sodium fluoride or sodium bromide.

Another embodiment of this invention is directed to an article that includes a positive electrode composition, as described herein. In one embodiment, the article includes a positive electrode. The positive electrode itself includes the positive electrode composition including at least one electroactive metal, at least one alkali metal halide, and at least one additive including a plurality of nanoparticles, wherein the plurality of nanoparticles include tungsten carbide.

In one embodiment, the article may be in the form of an uninterruptable power supply (UPS) device. In one embodiment, the article may be in the form of an energy storage device.

Another embodiment of the invention is directed to an energy storage device. In one embodiment, the energy storage device includes an electrochemical cell. Referring to FIG. 1, an electrochemical cell 100 is presented. More particularly, a front cross-sectional view 110 of the cell is depicted. The electrochemical cell 100 includes a housing 112. The housing 112 usually has an interior surface 114, defining a volume. A separator 116 is disposed inside the housing 112. The separator 116 has a first surface 118 that defines a first compartment 120 (for example, an anode compartment). The separator has a second surface 122 that defines a second compartment 124 (for example, a positive electrode compartment). The first compartment 120 is in ionic communication with the second compartment 124 through the separator 116. As used herein, the phrase "ionic communication" refers to the traversal of ions between the first compartment 120 and the second compartment 124, through the separator 116. In some embodiments, the separator is capable of transporting alkali metal ions between the first and the second compartments. Suitable ionic materials may include cationic forms of one or more of sodium, lithium and potassium.

Figure 2:
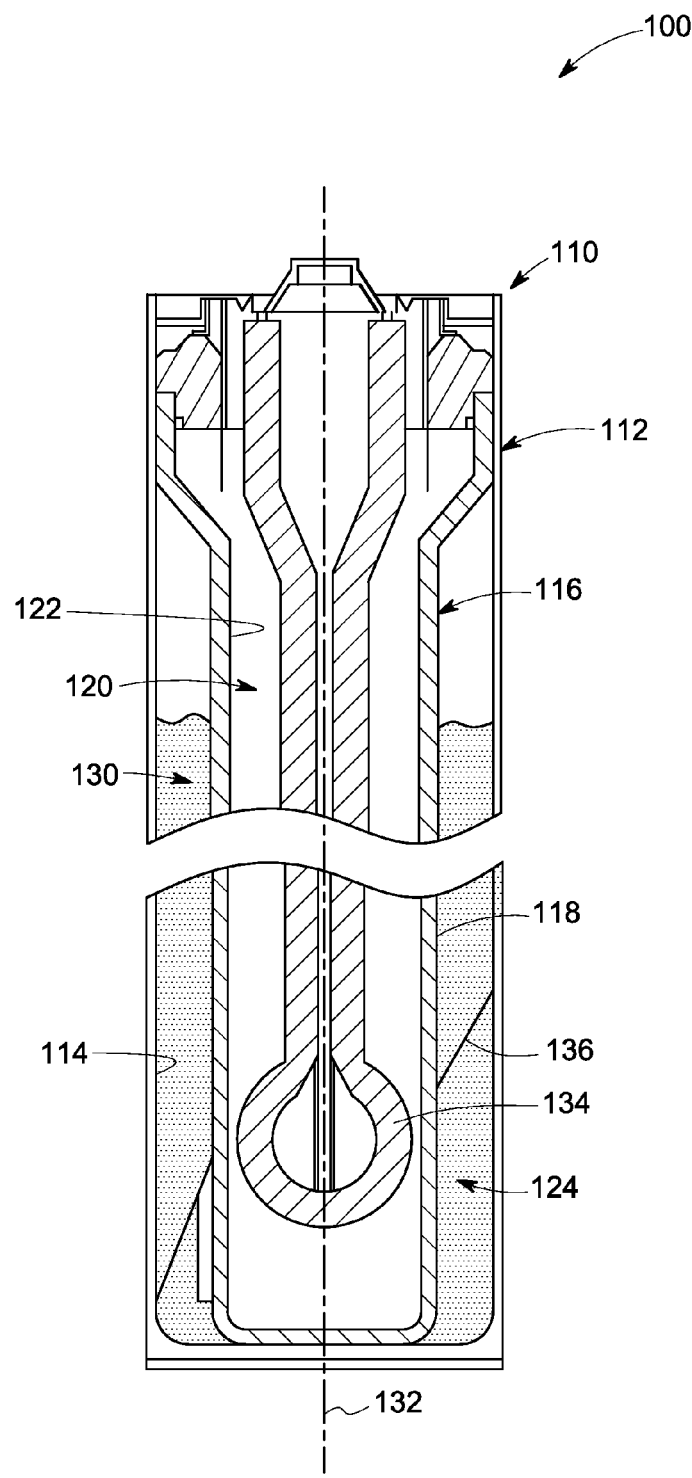
FIG. 2 is a schematic, cross-sectional view of a portion of an electrochemical cell, in accordance with some embodiments of the invention.

FIG. 1 depicts embodiments wherein the second compartment 124 is disposed within the first compartment 120. In such instances, the positive electrode compartment 124 is disposed within the anode compartment 120. In some other embodiments, the first compartment 120 is disposed in the second compartment 124, as indicated in FIG. 2. In such instances, the anode compartment 120 is disposed within the positive electrode compartment 124.

In one embodiment, the first compartment or the anode compartment 120 contains an anodic material (not shown); and the positive electrode compartment 124 contains a positive electrode composition or a cathodic material 130. Typically, the anode compartment 120 is empty in the ground state (uncharged state) of the electrochemical cell. The anode compartment 120 is then filled with metal from reduced metal ions that move from the positive electrode compartment 124 to the anode compartment 120 through the separator 116, during operation of the cell. The anode compartment 120 may receive and store a reservoir of the anodic material, in some embodiments. Typically, the anodic material includes an alkali metal. Non-limiting examples of the anodic material may include lithium, sodium, or potassium. The anodic material is usually molten during use. In one embodiment, the anodic material includes sodium.

In some embodiments, the anodic material may include one or more additives. Additives suitable for use in the anodic material may include a metallic oxygen scavenger. Suitable metal oxygen scavengers may include one or more of manganese, vanadium, zirconium, aluminum, or titanium. Other useful additives may include materials that increase wetting of the separator surface defining the anode compartment, by the molten anodic material. Additionally, some additives or coatings may enhance the contact or wetting between the separator and the current collector, to ensure substantially uniform current flow throughout the separator.

Further, as noted earlier, a positive electrode composition (or cathodic material) 130 is disposed inside the second compartment (positive electrode compartment) 124. In some embodiments, the positive electrode composition 130 includes at least one electroactive metal, at least one alkali metal halide, and at least one additive including a plurality of nanoparticles, wherein the plurality of nanoparticles includes tungsten carbide, and at least one electrolyte.

The positive electrode composition 130 may be self-supporting or may be liquid/molten, in some embodiments. In one embodiment, the positive electrode composition 130 is disposed on an electronically conductive support structure. The support structure may not undergo any chemical reaction during the charge/discharge, and may simply support the cathodic material during chemical reactions. The support structure may be in a number of forms, such as a foam, a mesh, a weave, a felt, or a plurality of packed particles, fibers, or whiskers. In one embodiment, a suitable support structure may be formed from carbon or a metal.

With continued reference to FIGS. 1 and 2, in some embodiments, the electrochemical cell may include a plurality of current collectors, including negative (e.g., anode) current collectors, and positive electrode current collectors. The anode current collector is in electrical communication with the anode chamber, and the positive electrode current collector is in electrical communication with the contents of the positive electrode chamber. Suitable materials for the anode current collector include iron, aluminum, tungsten, titanium, nickel, copper, molybdenum, carbon and combinations thereof. The positive electrode current collector may be in various forms, for example, rod, sheet, wire, paddle, or mesh. Suitable materials for the positive electrode current collector include platinum, palladium, gold, nickel, copper, carbon, titanium, and combinations thereof. The current collector may be plated or clad. In one embodiment, the current collector is free of iron.

As indicated in FIGS. 1 and 2, the electrochemical cell 100 may also include a negative electrode current collector (also referred to as the anode current collector) 126/134 disposed in the first compartment 120. In some embodiments, the negative electrode current collector may function as a shim, as well. A positive electrode current collector 128/136 is further disposed in the positive electrode compartment 124, as indicated in FIGS. 1 and 2.

With continued reference to FIGS. 1 and 2, in some embodiments, the housing 112 of the electrochemical cell may be sized and shaped to have a cross-sectional profile that is square, polygonal, or circular, for example. The housing may be formed from a material including a metal, ceramic, a composite; or combinations thereof. In some embodiments, a suitable metal may include nickel, iron, molybdenum, or steel.

As noted above, a separator 116 (FIGS. 1 and 2) is disposed within the volume of the housing. In some embodiments, the separator is a solid separator. In some embodiments, the solid separator is an alkali metal ion conductor solid electrolyte capable of transporting alkali metal ions between the first compartment and the second compartment. Suitable materials for the solid separator may include an alkali-metal-beta-alumina, alkali-metal-beta"-alumina, alkali-metal-beta'-gallate, or alkali-metal-beta"-gallate. In some embodiments, the solid separator may include a beta-alumina, a beta"-alumina, a gamma alumina, or a micromolecular sieve such as, for example, a tectosilicate, such as a feldspar, or a feldspathoid. Other exemplary separator materials include zeolites, for example a synthetic zeolite such as zeolite 3A, 4A, 13X, ZSM-5; rare-earth silicophosphates; silicon nitride; or a silicophosphate; a beta'-alumina; a beta"-alumina; a gamma alumina; a micromolecular sieve; or a silicophosphate (NASICON: $Na_3Zr_2Si_2PO_{12}$).

In some embodiments, the separator may be stabilized by the addition of small amounts of a dopant. The dopant may include one or more oxides selected from lithia, magnesia, zinc oxide, and yttria. These stabilizers may be used alone or in combination with themselves, or with other materials.

In particular embodiments, the separator includes a beta alumina. In one embodiment, a portion of the separator is alpha alumina, and another portion of the separator is beta alumina. In some embodiments, the alpha alumina (a non-ionic-conductor) may help with sealing and/or fabrication of the energy storage device. In a particular embodiment, the separator includes a beta alumina separator electrolyte (BASE), and may include one or more dopants.

As described for some embodiments in U.S. application Ser. No. 13/034,184, at least one of the alkali metals in the positive electrode composition may be sodium, and the separator may be beta-alumina. In another embodiment, the alkali metal may be potassium or lithium, with the separator then being selected to be compatible therewith. For example, in embodiments where the ions include potassium, silver, strontium, and barium cations, the separator material may include beta alumina. In certain other embodiments, where lithium cations are used, lithiated borophosphate $BPO_4$—$Li_2O$, may be employed as the separator material.

In some embodiments, the separator may be sized and shaped to have a cross-sectional profile that is square, polygonal, circular, or clover leaf, to provide a maximum surface area for alkali metal ion transport. In one embodiment, the separator may have a length to width ratio that is greater than about 1:10, along a vertical axis 132. In one embodiment, the length to width ratio of the separator is in a range of from about 1:10 to about 1:5, although other relative dimensions are possible, as described in U.S. application Ser. No. 13/034,184.

In some embodiments, the separator may have a cross-sectional profile normal to a vertical axis 132 of the housing 112 (FIGS. 1 and 2). Examples of profiles/shapes include a circle, a triangle, a square, a cross, a cloverleaf, or a star. Alternatively, the cross-sectional profile of the separator may be planar about the vertical axis 132. A planar configuration (or one with a slight dome) may be useful in a prismatic or button-type battery configuration, where the separator is domed or dimpled. Similarly, the separator may be flat or undulated. In one embodiment, the solid separator may include a shape which may be flat, undulated, domed or dimpled, or includes a shape with a cross-sectional profile that may be an ellipse, triangle, cross, star, circle, cloverleaf, rectangular, square, or multi-lobal.

In one embodiment, the separator may be a tubular container having at least one wall of a selected thickness; and a selected ionic conductivity. In some embodiments, the thickness of the separator wall may be less than about 5 millimeters. A cation facilitator material may be disposed on at least one surface of the separator, in one embodiment. The cation facilitator material may include, for example, selenium, as discussed in published U.S. Patent Application No. 2010/0086834, incorporated herein by reference.

In some embodiments, one or more shim structures may be disposed within the volume of the housing. The shim structures may support the separator within the volume of the housing. The shim structures may protect the separator from vibrations caused by the motion of the cell during use, and thus reduce or eliminate movement of the separator relative to the housing. In one embodiment, a shim structure may also function as a current collector, as described herein.

In some instances, the operating temperature of the cell may be in a range from about 270 degrees Celsius to about 350 degrees Celsius.

In some embodiments, the energy storage devices illustrated herein may be rechargeable over a plurality of charge-discharge cycles. In general, the energy storage device may be employed in a variety of applications; and the plurality of cycles for recharge may be dependent on factors such as charge and discharge current, depth of discharge, cell voltage limits, and the like.

Another embodiment of the invention is directed to an energy storage battery. In some embodiments, a plurality of the electrochemical cells (each of which may be considered a rechargeable energy storage device), as described herein, may be organized into an energy storage system, for example, a battery. Multiple cells may be connected in series or parallel, or in a combination of series and parallel. For convenience, a group of coupled cells may be referred to as a module or pack. The ratings for the power and energy of the module may depend on such factors as the number of cells, and the connection topology in the module. Other factors may be based on end-use application specific criteria.

Another embodiment of this invention is directed to a method for the preparation of an energy storage device, as mentioned previously. In some specific embodiments, the method includes providing a housing having an interior surface defining a volume; disposing a separator inside the housing, wherein the separator has a first surface that defines at least a portion of a first compartment (anode compartment), and a second surface that defines a second compartment (cathode compartment). The first compartment is in ionic communication with the second compartment through the separator.

The method further includes the step of preparing a positive electrode composition (as described previously), including a plurality of nanoparticles; and disposing the composition in the second compartment (cathode compartment). Other steps to fully fabricate the device may then be undertaken, for example, filling the cathode compartment with electrolyte, compartment-sealing steps, electrical connection steps, and the like. The method may further include cycling the battery or other type of energy storage device through a plurality of charge/discharge cycles, to activate or condition the positive electrode composition material.

EXAMPLES

The examples presented below are intended to be merely illustrative, and should not be construed to be any sort of limitation on the scope of the claimed invention. Unless specified otherwise, all of the components are commercially available from common chemical suppliers. Sodium chloride/nickel based energy storage cells were assembled, using the following materials:

TABLE 1

List of Materials for Sodium chloride/nickel based energy storage cell

| Material | Source | Properties |
| --- | --- | --- |
| Nickel 255 (metal nickel powder, Ni255) | Inco Special products | 97.9 percent pure, 0.6 square meters per gram surface area, 2.2 to 2.8 micrometers particle size) |
| Sodium Chloride (NaCl) | Custom Powders Ltd, UK | 99.99 percent pure |
| Iron (metal iron powder) (Fe) | Alfa Aesar Item #00170, | less than 10 micrometers particle size, 99.9 percent pure |
| Aluminum powder (Al) | Alfa Aesar Item #42919 | −100 + 325 mesh particle size, 99.97 percent pure |
| Sodium Fluoride (NaF) | Sigma Aldrich | ~99 percent pure |
| Sodium iodide (NaI) | Sigma Aldrich | ~99 percent pure |
| Tungsten Carbide (WC) | Inframat Advanced Materials | 74N-0601 nanocrystalline WC Powder. Average particle size: 150-200 nm. Average crystalline size: 40-70 nm |

Comparative Example 1

Positive Electrode Composition without Tungsten Nanoparticles

A sodium chloride/nickel based energy storage cell was assembled, using the composition provided in Table 2

| | Composition Wt % | | | | | | | |
| --- | --- | --- | --- | --- | --- | --- | --- | --- |
| | NaCl | Ni255 | Fe | Al | NaF | NaI | FeS | WC |
| Comparative Example 1 | 34.3 | 57.3 | 4.8 | 0.5 | 1.3 | 0.4 | 1.4 | |
| Example 1 | 34.2 | 57.1 | 4.8 | 0.5 | 1.3 | 0.4 | 1.4 | 0.37 |

The sodium chloride (NaCl) was obtained from a commercial source, already milled and vacuum-dried, and having an average particle size of less than about 95 micrometers. The material was re-dried in an oven at 240° C., before use. Positive electrode materials, including metal nickel powder, sodium chloride, sodium fluoride, sodium iodide, iron, and aluminum powder, were pressed at ambient room temperature (typically about 18° C.-25° C.), under a linear pressure of about 16-25 kN/cm, using an Alexanderwerk WP50N/75 Roll Compactor/Milling Machine. The resulting agglomerate was ground with a classifier mill into granules; and the fraction containing a particle size of about 0.325 to about 1.5 millimeters was used for the cell assembly.

In continuing with the preparation of the energy storage system, the electrolyte, sodium tetrachloroaluminate (NaAlCl$_4$), was prepared, by mixing and melting together sodium chloride and aluminum chloride. (The aluminum chloride was volatile when melted, so mixing and melting of the electrolyte salt was done as a separate step, before electrochemical cell fabrication). Preparation of the electrolyte salt was carried out in a nitrogen purge box, to keep the materials dry. To produce a 750 gram batch of NaCl-rich (basic) sodium tetrachloroaluminate, 500 grams of aluminum chloride and 250 grams of sodium chloride were mixed in a 500-milliliter reaction vessel. The reaction vessel was sealed with a clamped lid equipped with a gas outlet that was connected to a mineral oil bubbler to relieve any pressure.

The reaction vessel containing the dry powders was heated to 330° C., which was above the melting point of the electrolyte salt mixture. Once melted, about 5-10 grams of aluminum powder was introduced to the molten salt. The aluminum powder, which oxidizes readily, acts to scavenge impurities present in the raw materials.

Once melted, with impurities precipitated out, the sodium tetrachloroaluminate was filtered to remove the aluminum powder and the precipitates. The molten salt was filtered through a heated (from about 200-300° C.) glass frit (25 micrometers minimum pore size). The filtered molten salt was collected on aluminum foil. Once the filtered molten salt had solidified, it was manually chipped into smaller pieces, and then milled in a dedicated, laboratory-scale, grinding mill for 60 seconds. The sodium tetrachloroaluminate powder was stored in a glove box for use in cell fabrication as an electrolyte salt. Optionally, where needed, a portion of the sodium tetrachloroaluminate powder was combined with nickel chloride salt and sodium chloride, to produce a ternary electrolyte, which was stored in a glove box for use in cell fabrication. (The electrolyte may be prepared in a manner discussed herein, or can be directly obtained from Sigma Aldrich).

An electrochemical cell similar to that of FIG. 1 was assembled; and reference to the figure (cell 100) will be made here, to aid in this description. All cells were assembled in the discharged state. The separator tubes 116 for the cell 100, cylindrical or cloverleaf in shape, were produced according to known methods; or were commercially obtained. Each tube 116 was formed from ceramic sodium conductive beta"-alumina (β"-alumina tube). The cylinder dimensions were 228 millimeters length, 36 millimeters, internal diameter, and 38 millimeters, outside diameter. These are dimensions from lobe tip to lobe tip, when a clover leaf shaped separator tube was employed. Each ceramic separator tube was glass sealed to an alpha alumina collar, to form an assembly. Each assembly was placed in a stainless steel housing 112 that served as the housing to form an electrochemical cell. The housing size was about 38 millimeters×38 millimeters×230 millimeters.

The β"-alumina tube was pre-assembled with an anode chamber and a positive electrode current collector, and densified by vibration on a vibratory shaker in a nitrogen filled glove box. The positive electrode composition was then injected with the molten sodium tetrachloroaluminate NaAlCl$_4$ (as prepared above), under vacuum at 280° C. in the β"-alumina tube. Following this, the cell cap was welded at a temperature of about 230° C. inside the glove box, using a commercial welding system, with an ultra-high purity argon purge. The resulting electrochemical cell was then subjected to charging/discharging cycle testing as described below Example 1

Positive Electrode Composition with Tungsten Nanoparticles

A sodium chloride/nickel based energy storage cell was assembled, using the following composition provided in Table 2.

Electrochemical cells were fabricated using the method described above in Comparative Example 1, except 0.37 weight percent of tungsten carbide (WC) nanoparticles (150-200 nm) were added to the positive electrode materials during the premixing, pressurizing, and grinding steps of the granulation process.

Example 2

Testing of Cells

Cell testing was carried out, according to a standard protocol described in the referenced application Ser. No. 13/034,184, using a 100 A, 10V, multi-channel Digatron BTS600 battery testing system. The testing protocol involved a series of charging and discharging cycles, with a corresponding regimen of current, voltage, and temperature adjustments (approximately 225 cycles in all). For each cell described above in Comparative Example 1 and Example 1, the discharge capacity was measured, in terms of a "maiden discharge capacity check", which was initiated at low current, to avoid excessive current densities during the initial production of sodium in the negative electrode. This capacity check was also conducted approximately once per month during the testing process to determine if the discharge capacity was lost during repetitive cycling. After the maiden discharge capacity check, the cell was cycled by repetitively charging at 30 A to 2.67V with a 0.5 A trip, followed by 9.5 W discharges for 4 hours.

Figure 3:
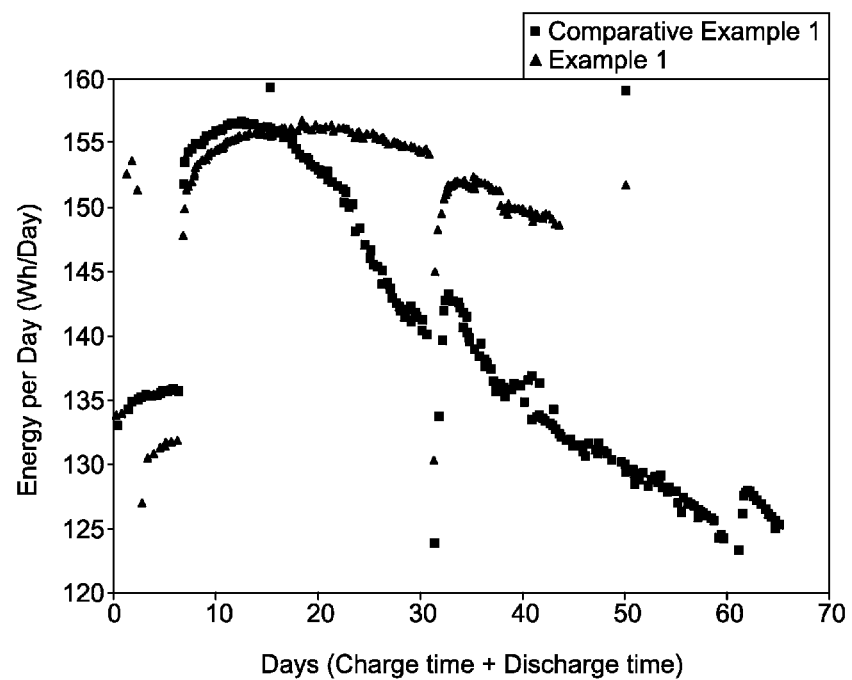
FIG. 3 is a plot of energy per day as a function of charging and discharging days for electrochemical cells in the presence and absence of plurality of nanoparticles.

FIG. 3 is a graph representing energy per day as a function of total charging and discharging duration. Energy/day is defined as 38 W-h divided by total discharge+charge time in days. Comparative Example 1 represents the cell that does not include WC nanoparticles in the positive electrode composition. Example 1 represents the cell that includes WC nanoparticles in the positive electrode composition. As illustrated in FIG. 3, cells including WC nanoparticles (Example 1) degraded at a much slower rate when compared to cells that did not include the WC nanoparticles in the positive electrode (Comparative Example 1).

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

The invention claimed is:

1. A positive electrode composition, comprising:
    at least one electroactive metal;
    at least one sodium halide; and
    at least one additive comprising a plurality of nanoparticles, wherein the plurality of nanoparticles comprises tungsten carbide.
2. The positive electrode composition of claim 1, wherein the at least one additive is present in an amount in a range from about 0.1 weight percent to about 5 weight percent of the positive electrode composition.
3. The positive electrode composition of claim 1, wherein the at least one additive is present in an amount in a range from about 0.25 weight percent to about 2.5 weight percent of the positive electrode composition.
4. The positive electrode composition of claim 1, wherein the plurality of nanoparticles have an average particle size in a range from about 10 nanometers to about 1000 nanometers.
5. The positive electrode composition of claim 1, wherein the at least one electroactive metal is selected from the group consisting of titanium, vanadium, niobium, molybdenum, nickel, cobalt, chromium, copper, manganese, silver, antimony, cadmium, tin, lead, iron, zinc, and combinations thereof.
6. The positive electrode composition of claim 1, wherein the at least one electroactive metal comprises nickel.
7. The positive electrode composition of claim 1, wherein the positive electrode composition comprises at least two electroactive metals.
8. The positive electrode composition of claim 7, wherein the at least two electroactive metals comprise nickel and iron.
9. The positive electrode composition of claim 1, wherein the at least one sodium halide comprises a chloride, bromide, or fluoride.
10. The positive electrode composition of claim 1, wherein the positive electrode composition comprises the at least one sodium halide and at least one additional alkali metal halide.
11. The positive electrode composition of claim 10, comprising sodium chloride and sodium iodide.
12. The positive electrode composition of claim 1 further comprising a metal sulfide.
13. The positive electrode composition of claim 1, further comprising an electrolyte.
14. An article, comprising:
    a positive electrode; which itself comprises:
        at least one electroactive metal;
        at least one sodium halide;
        at least one additive comprising a plurality of nanoparticles, wherein the plurality of nanoparticles comprises tungsten carbide.
15. The article of claim 14, in the form of an energy storage device or an uninterruptable power supply (UPS) device.
16. An energy storage device, comprising:
    (a) a first compartment comprising an alkali metal;
    (b) a negative electrode current collector;
    (c) a second compartment comprising a positive electrode composition, the positive cathode composition comprising:
        at least one electroactive metal;
        at least one sodium halide;
        at least one additive comprising a plurality of nanoparticles, wherein the plurality of nanoparticles comprises tungsten carbide; and
        at least one electrolyte;
    (d) a positive electrode current collector; and
    (e) a solid separator capable of transporting alkali metal ions between the first and the second compartments.
17. The energy storage device of claim 16, wherein the additive is present in an amount in a range from about 0.1 weight percent to about 5 weight percent of the positive electrode composition.

18. The energy storage device of claim 16, wherein the electroactive metal is selected from the group consisting of titanium, vanadium, niobium, molybdenum, nickel, cobalt, chromium, copper, manganese, silver, antimony, cadmium, tin, lead, iron, zinc, and combinations thereof.

19. The energy storage device of claim 16, wherein the second compartment is disposed within the first compartment.

20. The energy storage device of claim 16, wherein the first compartment is disposed within the second compartment.

21. The energy storage device of claim 16, characterized as being rechargeable over a plurality of cycles.

22. An energy storage battery comprising a plurality of rechargeable energy storage devices in accordance with claim 16.

23. A method for the preparation of an energy storage device, comprising:

(i) providing a housing having an interior surface defining a volume;

(ii) disposing a separator inside the housing, wherein the separator has a first surface that defines at least a portion of a first compartment, and a second surface that defines a second compartment, wherein the first compartment is in ionic communication with the second compartment through the separator;

(iii) disposing a positive electrode composition in the second compartment, wherein the positive electrode composition comprises:

at least one electroactive metal;

at least one sodium halide; and at least one additive comprising a plurality of nanoparticles, wherein the plurality of nanoparticles comprises tungsten carbide.

* * * * *